United States Patent
Minakuchi (10) Patent No.: US 12,145,413 B2
(45) Date of Patent: Nov. 19, 2024

(54) SUSPENSION CONTROL DEVICE, VEHICLE, AND SUSPENSION CONTROL METHOD

(71) Applicant: Hitachi Astemo, Ltd., Hitachinaka (JP)

(72) Inventor: Yuichiro Minakuchi, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 44 days.

(21) Appl. No.: 18/296,114

(22) Filed: Apr. 5, 2023

(65) Prior Publication Data
US 2023/0241940 A1    Aug. 3, 2023

Related U.S. Application Data (63) Continuation of application No. PCT/JP2021/028168, filed on Jul. 29, 2021.

(30) Foreign Application Priority Data

Nov. 26, 2020 (JP) .................................. 2020-196395

(51) Int. Cl.
*B60G 17/0165* (2006.01)
*B60G 17/018* (2006.01)

(52) U.S. Cl.
CPC ........ *B60G 17/0165* (2013.01); *B60G 17/018* (2013.01); *B60G 2500/10* (2013.01); *B60G 2600/1875* (2013.01)

(58) Field of Classification Search
CPC .............. B60G 17/0165; B60G 17/018; B60G 2500/10; B60G 2600/1875
See application file for complete search history.

(56) References Cited

U.S. PATENT DOCUMENTS 10,486,485 B1 * 11/2019 Levinson ........... B60G 17/0162
2006/0224287 A1 * 10/2006 Izawa .................... B60G 17/08
  701/37

(Continued)

FOREIGN PATENT DOCUMENTS

DE     4430364 B4    3/2005
DE  102014016857 A1  6/2015

(Continued)

OTHER PUBLICATIONS

German Office Action mailed Oct. 18, 2023 for the corresponding German Patent No. 112021004306.4 (6 pages including English translation).

(Continued)

*Primary Examiner* — Toan C To
(74) *Attorney, Agent, or Firm* — Leason Ellis LLP; Edward J. Ellis; Melvin C. Garner (57) ABSTRACT

A suspension control device which controls an operation of a suspension of a vehicle includes an operation-induced state quantity estimation portion which estimates an operation-induced state quantity caused by an operation of a vehicle, a road surface-induced state quantity estimation portion which estimates a road surface-induced state quantity caused by a road surface, an operation-induced state quantity conversion portion which converts the operation-induced state quantity into an operation-induced required damping force, a road surface-induced state quantity conversion portion which converts the road surface-induced state quantity into a road surface-induced required damping force, and a current value calculation portion which determines a current value to be applied to the suspension with reference to the operation-induced required damping force and the road surface-induced required damping force.

12 Claims, 5 Drawing Sheets

(56) References Cited

U.S. PATENT DOCUMENTS

| | | | |
|---|---|---|---|
| 2015/0081170 A1* | 3/2015 | Kikuchi | B60G 17/06 701/37 |
| 2015/0290995 A1 | 10/2015 | Kanda et al. | |
| 2017/0120710 A1* | 5/2017 | Yoshimi | B60G 17/018 |
| 2020/0023705 A1* | 1/2020 | Hirao | B60G 17/0182 |
| 2021/0162832 A1* | 6/2021 | Hwang | B60G 17/06 |
| 2022/0111695 A1* | 4/2022 | Furuta | B60G 17/018 |
| 2022/0161624 A1* | 5/2022 | Hirao | B60G 17/019 |
| 2022/0274643 A1* | 9/2022 | Fujimoto | B62D 6/008 |
| 2023/0081887 A1* | 3/2023 | Furuta | G01C 21/165 701/446 |
| 2023/0125985 A1* | 4/2023 | Furuta | B60G 17/06 701/37 |
| 2023/0249510 A1* | 8/2023 | Kawasaki | B60G 17/08 701/37 |
| 2023/0271471 A1* | 8/2023 | Yamahata | B60G 17/0165 280/5.507 |
| 2023/0294474 A1* | 9/2023 | Matsuura | B60G 17/018 701/37 |

FOREIGN PATENT DOCUMENTS

| | | |
|---|---|---|
| JP | 61184114 A | 8/1986 |
| WO | 2014002444 A1 | 1/2014 |

OTHER PUBLICATIONS

International Search Report mailed Oct. 12, 2021 for the corresponding PCT International Patent Application No. PCT/JP2021/028168 (5 pages including English translation).

* cited by examiner

SUSPENSION CONTROL DEVICE, VEHICLE, AND SUSPENSION CONTROL METHOD

CROSS-REFERENCE TO RELATED APPLICATIONS

This application is a Continuation of International Application No. PCT/JP2021/028168, which was filed on Jul. 29, 2021, which claims the benefit of priority to Japanese Application No. 2020-196395 filed on Nov. 26, 2020, the contents of all of which are incorporated herein by reference in their entireties.

FIELD OF THE INVENTION

The present invention relates to a suspension control device, a vehicle, and a suspension control method.

BACKGROUND OF THE INVENTION

In recent years, in dampers used for suspensions of automobiles, various dampers having a variable damping force capable of variably controlling a damping force stepwise or steplessly have been developed. As a mechanism for changing the damping force, a mechanical type in which an area of an orifice provided in a piston is changed by a rotary valve is known. In a vehicle equipped with such a variable damping force suspension (hereinafter, also simply referred to as "suspension"), by variably controlling a damping force of a damper according to a traveling state of the vehicle, it is possible to improve steering stability and riding comfort of the vehicle.

As for a suspension control method, a method of controlling a suspension based on an unsprung load, which is a force input to a vehicle, is known, and for example, a method is known in which a pitch angular velocity is obtained from an unsprung load, a front-rear acceleration, or the like, and control is performed so as to suppress a pitch (see, for example, Patent Literature 1).

CITATION LIST

Patent Literature

Patent Literature 1: WO-A-2014/002444

Here, a fluctuation of a pitch angular velocity in a traveling vehicle is generated by pushing up from a road surface or an accelerating and decelerating operation, and these causes may or may not be predictable in advance by a passenger. The same is true for other state quantities such as a bounce velocity and a roll angular velocity. However, the present inventors have found that even when a state quantities of behavior generated in a vehicle are the same, whether or not the driver can predict the behavior affects the driver's operation feeling and riding comfort. In the present specification, "caused by a vehicle operation of a passenger (driver)" such as an acceleration and deceleration operation and a turning operation may be referred to as "operation-induced". Further, in the present specification, "caused by condition of a road surface on which a vehicle travels" such as unevenness and swell of a road surface may be referred to as "road surface-induced".

An aspect of the present invention is to provide a technique capable of providing an operation feeling and riding comfort suitable for a driver of an automobile.

SUMMARY OF THE INVENTION

To solve the problems described above, a suspension control device according to an aspect of the present invention is a suspension control device which controls an operation of a suspension of a vehicle, including an operation-induced state quantity estimation portion which estimates an operation-induced state quantity which represents behavior caused by an operation of the vehicle, a road surface-induced state quantity estimation portion which estimates a road surface-induced state quantity which represents behavior of the vehicle caused by a road surface, an operation-induced state quantity conversion portion which converts the operation-induced state quantity into an operation-induced required damping force, a road surface-induced state quantity conversion portion which converts the road surface-induced state quantity into a road surface-induced required damping force, and a current value calculation portion which determines a current value to be applied to the suspension using the operation-induced required damping force and the road surface-induced required damping force.

Further, in order to solve the problems described above, a vehicle according to another aspect of the present invention has a suspension controlled by the suspension control device described above.

Further, to solve the problems described above, a suspension control method according to still another aspect of the present invention is a suspension control method for controlling an operation of a suspension of a vehicle, including an operation-induced state quantity estimation step of estimating an operation-induced state quantity which represents behavior caused by an operation of the vehicle, a road surface-induced state quantity estimation step of estimating a road surface-induced state quantity which represents behavior of the vehicle caused by a road surface, an operation-induced state quantity conversion step of converting the operation-induced state quantity estimated in the operation-induced state quantity estimation step into an operation-induced required damping force, a road surface-induced state quantity conversion step of converting the road surface-induced state quantity estimated in the road surface-induced state quantity estimation step into a road surface-induced required damping force, and a current value calculation step of determining a current value to be applied to the suspension using the operation-induced required damping force and the road surface-induced required damping force converted in the operation-induced state quantity conversion step and the road surface-induced state quantity conversion step.

According to the aspect of the present invention, it is possible to provide an operation feeling and riding comfort suitable for a driver of an automobile.

DETAILED DESCRIPTION OF THE INVENTION

The present inventors have found that even if the state quantity of the behavior generated in the vehicle is the same, the operation feeling and the riding comfort are affected by whether the driver can predict the behavior or not. The present invention has been made based on the above findings obtained by the present inventors, and provides a technique capable of providing an operation feeling and riding comfort suitable for a driver of an automobile. Hereinafter, an embodiment of the present invention will be described in more detail.

First Embodiment

[Vehicle]

Figure 1:
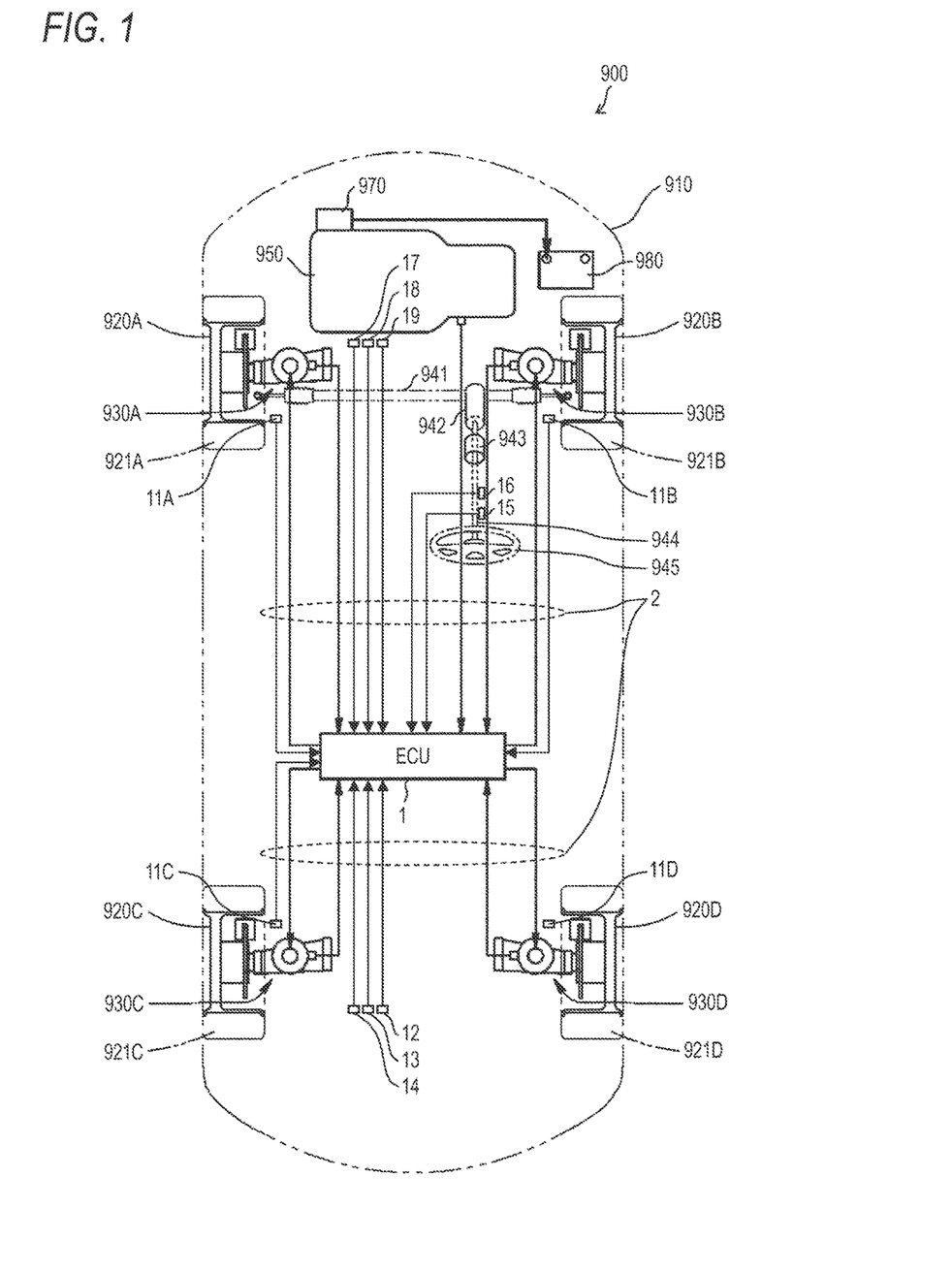
FIG. 1 is a diagram schematically illustrating an example of the configuration of a vehicle according to an embodiment of the present invention.

A vehicle according to the embodiment of the present invention has a suspension. The suspension is configured to be controlled by a suspension control device. FIG. 1 is a diagram schematically illustrating an example of a vehicle configuration according to the embodiment of the present invention.

As illustrated in FIG. 1, a vehicle 900 includes a suspension device (suspension) 930, a vehicle body 910, a vehicle wheel 920, a tire 921, a steering member 945, a steering shaft 944, a torque sensor 15, a steering angle sensor 16, a torque application portion 943, a rack and pinion mechanism 942, a rack shaft 941, an engine 950, an electronic control unit (ECU) 1, a power generation device 970, and a battery 980. Examples of the vehicle 900 include a gasoline vehicle, a hybrid electric vehicle (HEV vehicle), an electric vehicle (EV vehicle), and the like.

The vehicle wheel 920 on which the tire 921 is mounted is suspended from the vehicle body 910 by the suspension device 930. Since the vehicle 900 is a four-wheeled vehicle, four suspension devices 930, four vehicle wheels 920, and four tires 921 are provided. The tires and vehicle wheels of a left front wheel, a right front wheel, a left rear wheel, and a right rear wheel are also referred to as a tire 921A and a vehicle wheel 920A, a tire 921B and a vehicle wheel 920B, a tire 921C and a vehicle wheel 920C, and a tire 921D and a vehicle wheel 920D, respectively. Hereinafter, similarly, the configurations attached to the left front wheel, the right front wheel, the left rear wheel, and the right rear wheel may be represented by adding the reference letters "A", "B", "C", and "D".

[Suspension Device (Suspension)]

The suspension device 930 includes a hydraulic shock absorber, an upper arm, and a lower arm. Further, as an example, the hydraulic shock absorber includes a solenoid valve which is an electromagnetic valve for adjusting a damping force generated by the hydraulic shock absorber. However, this does not limit the present embodiment, and the hydraulic shock absorber may use an electromagnetic valve other than the solenoid valve as the electromagnetic valve for adjusting the damping force. For example, it may adopt a configuration in which an electromagnetic valve using an electromagnetic fluid (magnetic fluid) is provided as the electromagnetic valve described above.

[Steering Device]

The steering member 945 operated by a driver is connected to one end of the steering shaft 944 so as to be able to transmit torque, and the other end of the steering shaft 944 is connected to the rack and pinion mechanism 942.

In the above description, "connected so as to be able to transmit torque" means that members are connected so that the rotation of one member causes the rotation of the other member. For example, at least the case where one member and the other member are integrally molded, the case where one member is directly or indirectly fixed to the other member, and the case where one member and the other member are connected so as to be interlocked with each other via a joint member or the like are included.

The rack and pinion mechanism 942 is a mechanism for converting the rotation of the steering shaft 944 around an axis into a displacement along an axis of the rack shaft 941. When the rack shaft 941 is displaced in an axial direction, the vehicle wheel 920A and the vehicle wheel 920B are steered via a tie rod and a knuckle arm.

The torque sensor 15 detects the steering torque applied to the steering shaft 944, in other words, the steering torque applied to the steering member 945, and provides the ECU 1 with a torque sensor signal indicating a detection result. More specifically, the torque sensor 15 detects the twist of a torsion bar built in the steering shaft 944 and outputs a detection result as a torque sensor signal. A magnetostrictive torque sensor may be used as the torque sensor 15.

The steering angle sensor 16 detects a steering angle of the steering member 945 and provides a detection result to the ECU 1.

The torque application portion 943 applies an assist torque or a reaction torque according to a steering control amount supplied from the ECU 1 to the steering shaft 944. The torque application portion 943 includes a motor which generates an assist torque or a reaction torque according to the steering control amount, and a torque transmission mechanism which transmits the torque generated by the motor to the steering shaft 944.

Specific examples of the "control amount" in the present specification include a current value, a duty ratio, an attenuation rate, and an attenuation ratio.

Further, in the example described above, a steering device in which the steering member 945 to the rack shaft 941 are always mechanically connected is taken as an example, but the present embodiment is not limited to this. The steering device according to the present embodiment may be, for example, a steering device of a steer-by-wire type. The matters described below in this specification can also be applied to the steering device of the steer-by-wire type.

[Driving Force Transmission Device]

The vehicle 900 has a driving force transmission device (not illustrated). The driving force transmission device is, for example, a device which transmits the power of an engine to the front wheels or the rear wheels, and has a gear transmission mechanism. The gear transmission mechanism is a differential device which gives the difference in the rotation speed of respective vehicle wheels in the front wheels or the rear wheels according to the situation, and has a differential limiting device which limits the differential according to the traveling condition of the vehicle 900. In the present embodiment, the differential device and the differential limiting device are not limited. The differential device may be, for example, a bevel gear type differential device, and the differential limiting device may be a torque-sensitive type device such as a multi-plate clutch type limited slip differential (LSD) or a helical gear type LSD, or may be a rotation difference sensitive type device such as a viscous LSD.

[Other Configurations]

The power generation device 970 is attached to the engine 950, and the electric power generated by the power generation device 970 is stored in the battery 980.

Further, the vehicle 900 includes a vehicle wheel speed sensor 11 provided for each vehicle wheel 920 and detecting the vehicle wheel speed (angular velocity to of the vehicle wheel) of each vehicle wheel 920. In addition, the vehicle 900 may be configured to include a lateral G sensor 14 which detects the lateral acceleration of the vehicle 900, a front-rear G sensor 13 which detects the front-rear acceleration of the vehicle 900, a yaw rate sensor 12 which detects the yaw rate of the vehicle 900, an engine torque sensor 17 which detects the torque generated by the engine 950, an engine rotation speed sensor 18 which detects the rotation speed of the engine 950, and a brake pressure sensor 19 which detects the pressure applied to brake liquid of a braking device. Detection results by these various sensors are supplied to the ECU 1.

Although not illustrated, the vehicle 900 includes an antilock brake system (ABS), which is a system to prevent the vehicle wheel from locking during braking, a traction control system (TCS), which suppresses the slipping of the vehicle wheel during acceleration or the like, a vehicle stability assist (VSA) controllable braking device, which is a vehicle behavior stabilization control system equipped with an automatic braking function for yaw moment control and brake assist function during turning.

Here, the ABS, TCS, and VSA compare the vehicle wheel speed determined according to the estimated vehicle body speed with the vehicle wheel speed detected by the vehicle wheel speed sensor 11, and then the ABS, TCS, and VSA determine that the vehicle is in a slip state when values of these two vehicle wheel speeds differ by a predetermined value or more. Through such processing, the ABS, TCS, and VSA aim to stabilize the behavior of the vehicle 900 by performing optimum brake control or traction control according to the traveling state of the vehicle 900.

Further, the supply of the detection results by the various sensors described above to the ECU 1 and the transmission of the control signal from the ECU 1 to each part are performed via a controller area network (CAN) 2.

Further, the vehicle 900 has a random access memory (RAM) (not illustrated). The RAM stores steady-state or estimated values such as the weight (vehicle weight) of a vehicle, the inertial load, and the vehicle specifications, and calculated values. The steady-state value is, for example, a value of a physical quantity peculiar to the vehicle 900.

Further, the vehicle 900 includes ECUs (not illustrated) for the suspension device 930, the steering device, and the driving force transmission device to control the operations thereof. For example, the vehicle 900 has a damper ECU for controlling the suspension device 930. Such an ECU dedicated to the device of the vehicle 900 may be provided in the device to be controlled, or may be provided in the ECU 1 for controlling the vehicle 900. As described above, the suspension device 930, the steering device, and the driving force transmission device in the vehicle 900 are all configured to be electronically controllable, and can also be said to be an electronically controlled suspension, an electronically controlled steering device, and an electronically controlled driving force transmission device.

[Overview of Suspension Control]

The ECU 1 controls the suspension device 930 by supplying a suspension control amount. More specifically, the ECU 1 controls opening and closing of a solenoid valve by supplying a suspension control amount to the solenoid valve included in a hydraulic shock absorber included in the suspension device 930. In order to enable this control, a power line for supplying drive power from the ECU 1 to the solenoid valve is arranged.

[Overview of Steering Control]

Further, the ECU 1 comprehensively controls various electronic devices included in the vehicle 900. More specifically, the ECU 1 controls the magnitude of assist torque or reaction torque applied to the steering shaft 944 by adjusting the steering control amount supplied to the torque application portion 943.

[Overview of Control of Driving Force Transmission Device]

The ECU 1 controls the driving force transmission device by supplying, for example, a control amount of the differential limit. To give a specific example, by adjusting the crimping strength of the clutch in the multi-plate clutch type LSD according to the traveling condition, the ECU 1 distributes the driving force of the engine between the front wheels and the rear wheels, or between the left and right vehicle wheels on the front wheels or the rear wheels, and controls the individual rotation speed of the vehicle wheels rotated by the driving force of the engine.

[Functional Configuration of Suspension Control Device]

Figure 2:
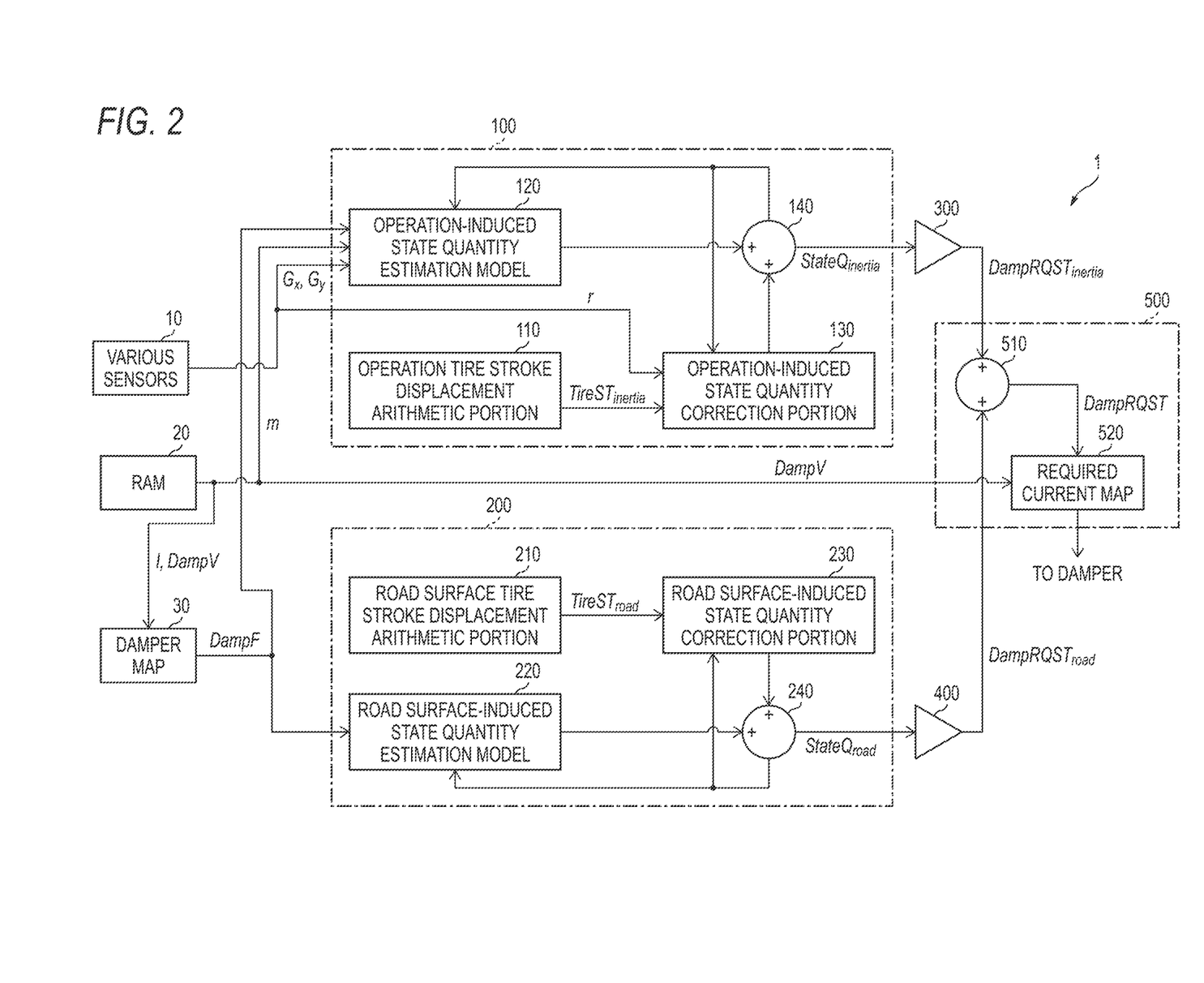
FIG. 2 is a block diagram illustrating an example of a functional configuration of a suspension control device according to the embodiment of the present invention.

The ECU 1 includes a suspension control device. FIG. 2 is a block diagram illustrating an example of a functional configuration of a suspension control device according to the embodiment of the present invention. As illustrated in FIG. 2, the suspension control device includes an operation-induced state quantity estimation portion 100, a road surface-induced state quantity estimation portion 200, an operation-induced state quantity conversion portion 300, a road surface-induced state quantity conversion portion 400, and a current value calculation portion 500. The suspension control device controls the operation of the suspension of the vehicle.

[Estimation of Operation-induced State Quantity]

Figure 3:
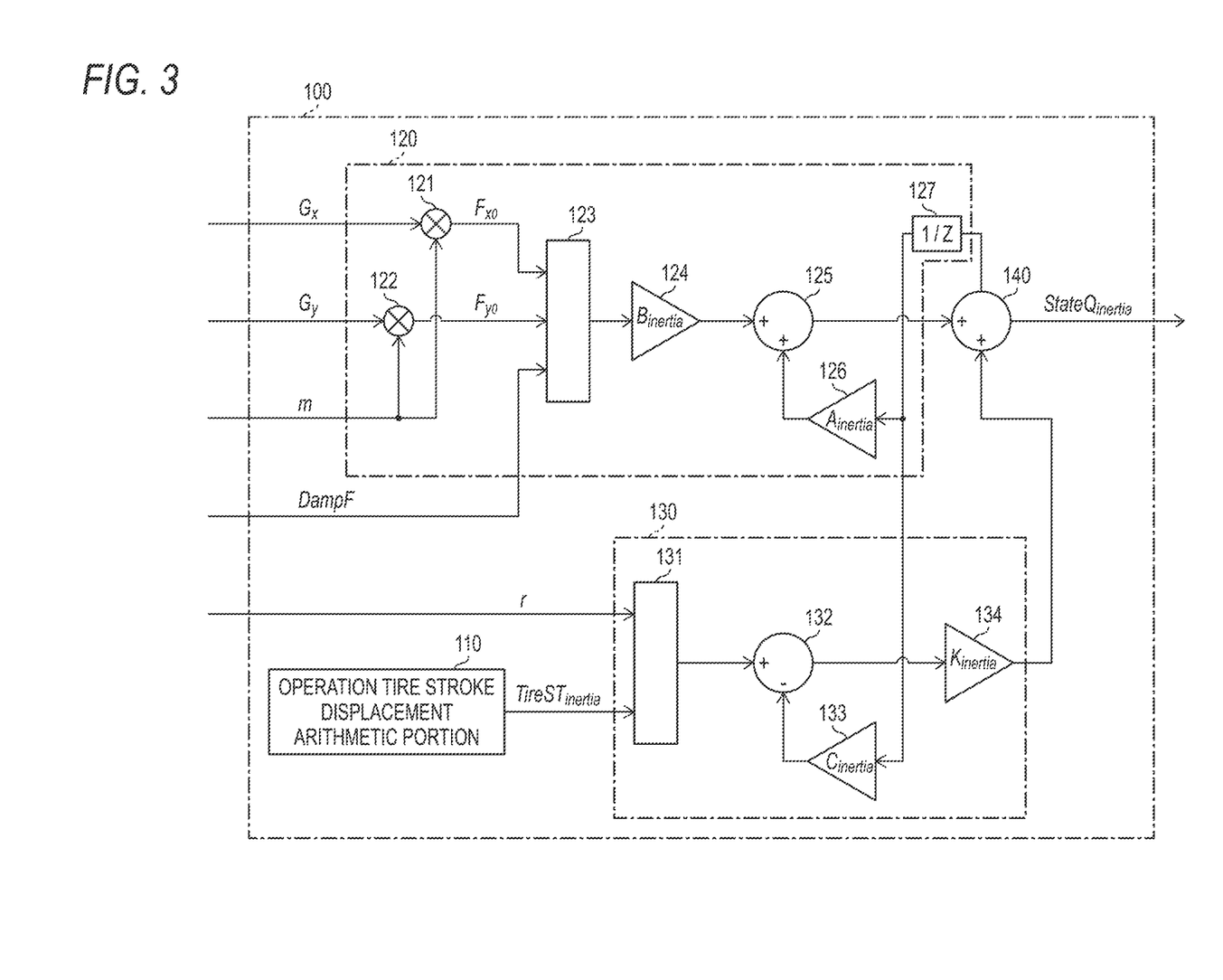
FIG. 3 is a block diagram illustrating an example of a functional configuration of an operation-induced state quantity estimation portion according to the embodiment of the present invention.

The operation-induced state quantity estimation portion 100 estimates the operation-induced state quantity which represents the behavior caused by the operation of the vehicle. For example, the operation-induced state quantity estimation portion 100 estimates the state quantity of the vehicle behavior by referring to the force applied to the tire caused by the driver's vehicle operation and the amount of change in the dimensions of the tire. Further, the operation-induced state quantity estimation portion 100 estimates the state quantity of the vehicle behavior caused by the driver's vehicle operation by using the Kalman filter. FIG. 3 is a block diagram illustrating an example of a functional configuration of the operation-induced state quantity estimation portion according to the embodiment of the present invention.

As illustrated in FIG. 2, the operation-induced state quantity estimation portion 100 includes an operation tire stroke displacement arithmetic portion 110, an operation-induced state quantity estimation model 120, an operation-induced state quantity correction portion 130, and an operation-induced state quantity correction addition portion 140.

The operation tire stroke displacement arithmetic portion 110 calculates an operation tire stroke displacement TireST$_{inertia}$ caused by the operation by the driver. The operation tire Stroke displacement is the amount of deformation (displacement) of the tire caused by a load when the load is applied to the tire due to the driver's vehicle operation, and is expressed in units of length. As an example of the calculation method, there is a method of calculating an inertial load of each vehicle wheel, which is a load fluctuation caused by the driver's vehicle operation, and multiplying this by a conversion value G indicating the spring constant of the tire. As the method for calculating the inertial load, for example, the method described in Japanese Patent No. 6748765 can be used.

The operation-induced state quantity estimation model 120 estimates the state quantity (operation-induced state quantity) of the vehicle caused by the driver's operation. As illustrated in FIG. 3, the operation-induced state quantity estimation model 120 includes a first arithmetic portion 121, a second arithmetic portion 122, an input amount configuration portion 123, an input matrix $B_{inertia}$ 124, an addition portion 125, a system matrix $A_{inertia}$ 126, and a delay portion 127.

The operation-induced state quantity estimation model 120 acquires a value $G_x$ of a front-back acceleration sensor as the front-back acceleration and a value $G_y$ of a lateral acceleration sensor as the lateral acceleration from various sensors 10. The front-rear acceleration is the acceleration of the vehicle in a front-rear direction, and the lateral acceleration is the acceleration of the vehicle in a lateral direction. Further, the operation-induced state quantity estimation model 120 acquires a vehicle weight m from the RAM 20. Further, the operation-induced state quantity estimation model 120 acquires a damper force DampF.

In the present embodiment, the operation-induced state quantity estimation model 120 acquires an applied current I and a damper speed DampV from the RAM 20, and acquires the damper force DampF from a damper map 30 which is a map for outputting the damper force DampF. The applied current I is the value of the current applied to the solenoid valve used to control the damping force in the damper of the suspension. For example, the applied current I and the damper speed DampV write feedback from a damper ECU to the RAM 20, and the damper map 30 can acquire these.

The first arithmetic portion 121 acquires a total tire front-rear force $F_{x0}$ by multiplying the value $G_x$ of the front-rear acceleration sensor acquired from the various sensors 10 by the vehicle weight m acquired from the RAM 20. The second arithmetic portion 122 acquires a total tire lateral force $F_{y0}$ by multiplying the value $G_y$ of the lateral acceleration sensor acquired from the various sensors 10 by the vehicle weight m acquired from the RAM 20.

The input amount configuration portion 123 acquires the total tire front-rear force $F_{x0}$, the total tire lateral force $F_{y0}$, and the damper force DampF, and acquires the input amount. The input amount can be represented by a matrix.

The operation-induced state quantity estimation model 120 acquires the input amount described above, multiplies it by the input matrix $B_{inertia}$ 124, and calculates the product of the input amount and the input matrix $B_{inertia}$ 124, in such a manner that the operation-induced state quantity estimation model 120 calculates a first operation-induced state quantity, which is the state quantity caused by the driver's operation in the vehicle in this control.

The addition portion 125 adds the first operation-induced state quantity described above and the "value based on a previous estimation result" to acquire a second operation-induced state quantity caused by the driver's operation in the vehicle.

In the present embodiment, the operation-induced state quantity estimation model 120 is a state space model. Therefore, in the operation-induced state quantity estimation model 120, a value obtained by multiplying the feedback of the "previous estimation result" by the system matrix $A_{inertia}$ 126 is input. The value is input to the addition portion 125 as a "value based on the previous estimation result". This addition result is the output value of the operation-induced state quantity estimation model 120, that is, the estimation result. In the present embodiment, the "previous estimation result" of the operation-induced state quantity estimation model 120 is a value obtained by an operation-induced state quantity $StateQ_{inertia}$ calculated by the operation-induced state quantity correction addition portion 140, which will be described below, via the delay portion 127.

Assuming that the current number of operations is n, the delay portion 127 has a function of supplying the operation-induced state quantity StateQv at the time of n−1 to each of the operation-induced state quantity estimation model 120 and the operation-induced state quantity correction portion 130.

The operation-induced state quantity correction portion 130 calculates a correction amount of the operation-induced state quantity. The operation-induced state quantity correction portion 130 includes an operation-induced state quantity correction observation amount construction portion 131, a subtraction portion 132, a system matrix $C_{inertia}$ 133, and a Kalman gain $K_{inertia}$ 134.

The operation-induced state quantity correction observation amount construction portion 131 acquires a value r of the yaw rate sensor from various sensors 10, and acquires an operation tire stroke displacement $TireST_{inertia}$ of each vehicle wheel of the vehicle from the operation tire stroke displacement arithmetic portion 110, and then constructs an operation-induced state quantity correction observation amount. The operation-induced state quantity correction observation amount is a 5×1 matrix including the amount of change in the current tire. That is, the tire stroke displacement is the amount of change in a tire radius, which is one aspect of the amount of change in tire.

The subtraction portion 132 acquires the above-described operation-induced state quantity correction observation amount, and subtracts the "value based on the previous estimation result" from the operation-induced state quantity correction observation amount so that each element of the operation-induced state quantity correction observation amount becomes the amount of change from the value based on the "previous estimation result".

In the subtraction portion 132, a value obtained by multiplying the "previous estimation result" by an observation matrix $C_{inertia}$ 133 (for example, a p×5 matrix) is input. The value is the above-described "value based on the previous estimation result". In this way, the previous estimation result is input to the subtraction portion 132 as feedback via the observation matrix $C_{inertia}$ 133. In the present embodiment, the "previous estimation result" of the operation-induced state quantity correction portion 130 is the same as the "previous estimation result" of the operation-induced state quantity estimation model 120.

The operation-induced state quantity correction portion 130 multiplies the calculation result of the subtraction portion 132 by the Kalman gain $K_{inertia}$ 134. The Kalman gain $K_{inertia}$ 134 is the gain of the Kalman filter. In this way, the operation-induced state quantity correction portion 130 calculates the output value in the operation-induced state quantity correction portion 130. The output value in the operation-induced state quantity correction portion 130 is the correction amount of the operation-induced state quantity.

As described above, in the present embodiment, the above-described operation-induced state quantity estimation model 120 corresponds to an estimation model part of the Kalman filter, and the operation-induced state quantity correction portion 130 corresponds to a filtering part of the Kalman filter. The Kalman gain $K_{inertia}$ 134 in the operation-induced state quantity correction portion 130 is time-invariant in the present embodiment, but may be time-variant.

The output value of the operation-induced state quantity estimation model 120 and the output value of the operation-induced state quantity correction portion 130 are input to the operation-induced state quantity correction addition portion 140. Then, the operation-induced state quantity $StateQ_{inertia}$ is calculated as the output value of the operation-induced state quantity correction addition portion 140 which is the sum of those values. The operation-induced state quantity inertia is $StateQ_{inertia}$ a corrected estimation result obtained by correcting the estimation result of the operation-induced state quantity estimation model 120 by the Kalman filter.

[Estimation of Road Surface-Induced State Quantity]

The road surface-induced state quantity estimation portion 200 estimates a road surface-induced state quantity which represents the behavior of the vehicle caused by the road surface. For example, the road surface-induced state quantity estimation portion 200 estimates the state quantity of the vehicle behavior by referring to the force applied to the tire caused by the road surface and the amount of change in the dimensions of the tire. Further, in the present embodiment, the road surface-induced state quantity estimation portion 200 estimates the state quantity of the vehicle behavior caused by the input from the road surface by using the Kalman filter. In the following description, some explanations will be omitted with respect to the parts common to those of the operation-induced state quantity estimation model 120.

As illustrated in FIG. 2, the road surface-induced state quantity estimation portion 200 includes a road surface tire stroke displacement arithmetic portion 210, a road surface-induced state quantity estimation model 220, a road surface-induced state quantity correction portion 230, and a road surface-induced state quantity correction addition portion 240.

The road surface tire stroke displacement arithmetic portion 210 calculates a road surface tire stroke displacement $TireST_{road}$. The road surface tire stroke displacement is the amount of deformation (displacement) of the tire caused by a load applied to the tire due to road surface input, and is expressed in units of length. The road surface tire stroke displacement can be calculated, for example, by calculating a road surface load of each wheel of the vehicle, which is the load fluctuation caused by the road surface input, and multiplying this by the conversion value G indicating the spring constant of the tire. As a method for calculating the road surface load, for example, the method described in Japanese Patent No. 6695481 can be used.

Figure 4:
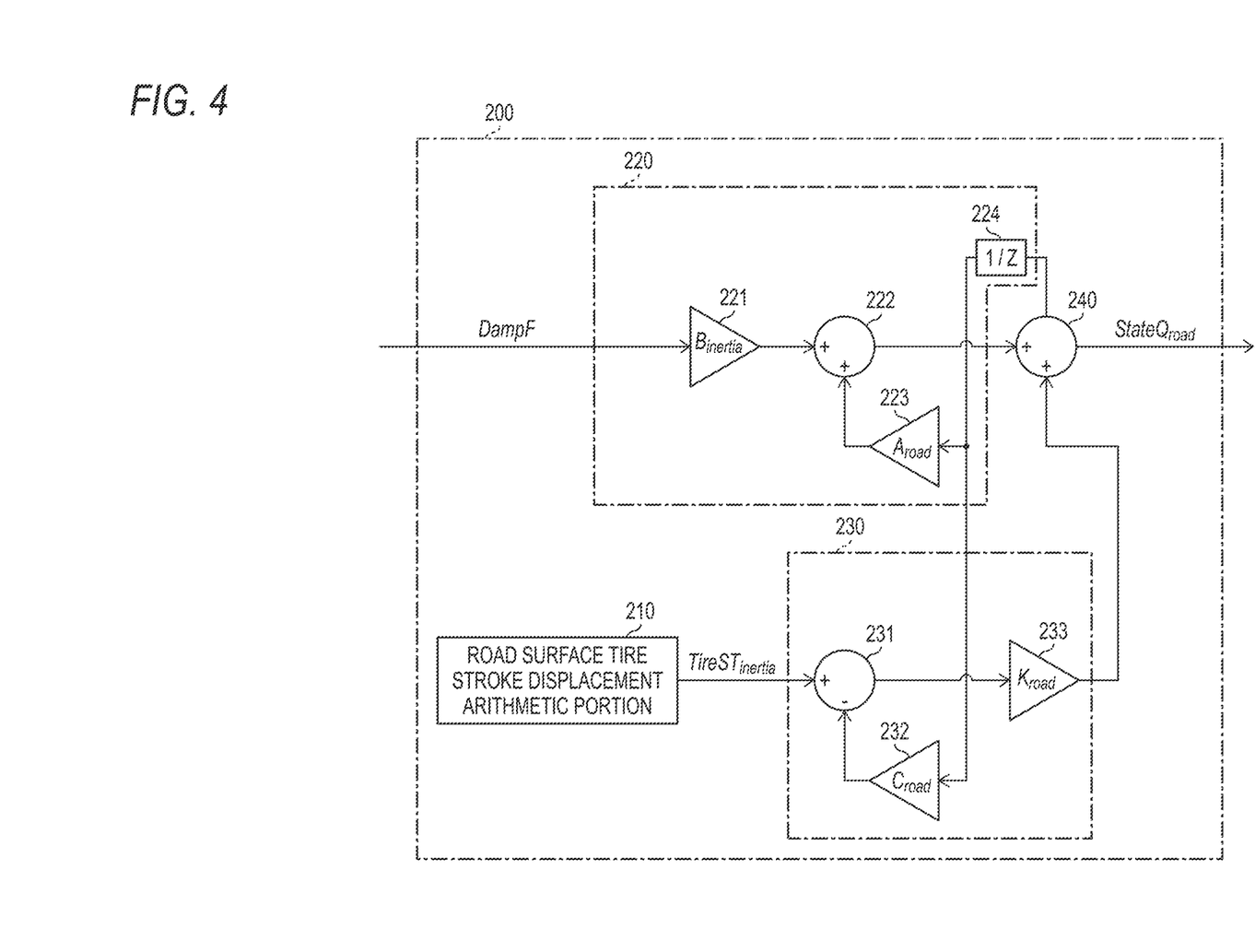
FIG. 4 is a block diagram illustrating an example of a functional configuration of a road surface-induced state quantity estimation portion according to the embodiment of the present invention.

FIG. 4 is a block diagram illustrating an example of a functional configuration of the road surface-induced state quantity estimation portion according to the embodiment of the present invention. The road surface-induced state quantity estimation model 220 estimates the state quantity (road surface-induced state quantity) of the vehicle caused by the road surface input. As illustrated in FIG. 4, the road surface-induced state quantity estimation model 220 can be constructed with the same functional configuration as the operation-induced state quantity estimation model 120. The road surface-induced state quantity estimation model 220 includes an input matrix $B_{road}$ 221, an addition portion 222, a system matrix $A_{road}$ 223, and a delay portion 224.

The road surface-induced state quantity estimation model 220 acquires the damper force DampF from the damper map 30.

The road surface-induced state quantity estimation model 220 acquires the damper force DampF and multiplies it by the input matrix $B_{road}$ 221 to calculate a first road surface-induced state quantity, which is the state quantity of the vehicle caused by the road surface input in the vehicle in this control.

The addition portion 222 adds the above-described first road surface-induced state quantity and the "value based on the previous estimation result" to acquire a second road surface-induced state quantity caused by the driver's operation in the vehicle.

In the present embodiment, the road surface-induced state quantity estimation model 220 is composed of a state space model. Therefore, in the road surface-induced state quantity estimation model 220, a value obtained by multiplying the feedback of the previous estimation result by the system matrix $A_{road}$ 223 is input. The value is input to the addition portion 222 as the "value based on the previous estimation result". This addition result is the output value of the road surface-induced state quantity estimation model 220, that is, the estimation result. In the present embodiment, the "previous estimation result" of the road surface-induced state quantity estimation model 220 is a value obtained by a road surface-induced state quantity $StateQ_{road}$ calculated by the road surface-induced state quantity correction addition portion 240, which will be described below, via the delay portion 224.

Assuming that the current number of operations is n, the delay portion 224 has a function of supplying the road surface-induced state quantity $StateQ_{road}$ at the time of n−1 to each of the road surface-induced state quantity estimation model 220 and the road surface-induced state quantity correction portion 230.

The road surface-induced state quantity correction portion 230 calculates a correction amount of the road surface-induced state quantity. The road surface-induced state quantity correction portion 230 can be constructed with the same functional configuration as the operation-induced state quantity correction portion 130. The road surface-induced state quantity correction portion 230 includes a subtraction portion 231, an observation matrix $C_{road}$ 232, and a Kalman gain $K_{road}$ 233.

The subtraction portion 231 acquires the road surface tire stroke displacement $TireST_{road}$ of each vehicle wheel of the vehicle from the road surface tire stroke displacement arithmetic portion 210. The road surface tire stroke displacement $TireST_{road}$ of each vehicle wheel of the vehicle acquired by the subtraction portion 231 is acquired as a 4×1 matrix. The matrix includes the amount of change in the current tire as well as the operation-induced state quantity correction observation amount, and becomes a road surface-induced state quantity correction observation amount. The subtraction portion 231 subtracts the "value based on the previous estimation result" from the road surface-induced state quantity correction observation amount so that each element of the road surface-induced state quantity correction observation amount becomes the amount of change from the value based on the "previous estimation result".

In the subtraction portion 231, a value obtained by multiplying the "previous estimation result" by the observation matrix $C_{road}$ 232 is input. The value is the above-described "value based on the previous estimation result". In this way, the previous estimation result is input to the subtraction portion 231 as feedback via the observation matrix $C_{road}$ 232. In the present embodiment, the "previous estimation result" of the road surface-induced state quantity estimation model 220 is the same as the "previous estimation result" of the road surface-induced state quantity estimation model 220.

The road surface-induced state quantity correction portion 230 multiplies the calculation result of the subtraction portion 231 by the Kalman gain $K_{road}$ 233. The Kalman gain $K_{road}$ 233 is the gain of the Kalman filter. In this way, the output value in the road surface-induced state quantity correction portion 230 is calculated. The output value in the road surface-induced state quantity correction portion 230 is the correction amount of the road surface-induced state quantity.

As described above, in the present embodiment, the road surface-induced state quantity estimation model 220 corresponds to an estimation model part of the Kalman filter, and the road surface-induced state quantity correction portion 230 corresponds to a filtering part of the Kalman filter. The Kalman gain $K_{road}$ 233 in the road surface-induced state quantity correction portion 230 is also time-invariant in the present embodiment, but may be time-variant.

The output value of the road surface-induced state quantity estimation model 220 and the output value of the road surface-induced state quantity correction portion 230 are input to the road surface-induced state quantity correction addition portion 240. Then, the road surface-induced state quantity $StateQ_{road}$ is calculated as the output value of the road surface-induced state quantity correction addition portion 240 which is the sum of those values. The road surface-induced state quantity $StateQ_{road}$ is a corrected estimation result in which the estimation result of the road surface-induced state quantity estimation model 220 is corrected by the Kalman filter described above.

[Conversion of Operation-induced State Quantity]

The operation-induced state quantity conversion portion 300 converts the operation-induced state quantity estimated by the operation-induced state quantity estimation portion into the operation-induced required damping force. For example, the operation-induced state quantity conversion portion 300 converts the operation-induced state quantity $StateQ_{inertia}$ calculated in the operation-induced state quantity correction addition portion 140 into an operation-induced required damping force $DampRQST_{inertia}$. The operation-induced required damping force $DampRQST_{inertia}$ means a required damping force required to control the vehicle behavior change caused by the operation. The operation-induced state quantity conversion portion 300 converts the operation-induced state quantity $StateQ_{inertia}$ into the operation-induced required damping force $DampRQST_{inertia}$ by multiplying the operation-induced state quantity $StateQ_{inertia}$ by a predetermined coefficient.

[Conversion of Road Surface-induced State Quantity]

The road surface-induced state quantity conversion portion 400 converts the road surface-induced state quantity estimated by the road surface-induced state quantity estimation portion into the road surface-induced required damping force. For example, the road surface-induced state quantity conversion portion 400 converts the road surface-induced state quantity $StateQ_{road}$ into the road surface-induced required damping force $DampRQST_{road}$ The road surface-induced required damping force $DampRQST_{road}$ means the required damping force required to control the vehicle behavior change caused by the road surface. The road surface-induced state quantity conversion portion 400 converts the road surface-induced state quantity $StateQ_{road}$ into the road surface-induced required damping force $DampRQST_{road}$ by multiplying the road surface-induced state quantity $StateQ_{road}$ by a predetermined coefficient.

[Conversion of State Quantity when State Quantities are the Same]

Here, in the present embodiment, when the operation-induced state quantity $StateQ_{inertia}$ and the road surface induced state quantity $StateQ_{road}$ are the same, the road surface-induced state quantity conversion portion 400 converts the road surface-induced state quantity $StateQ_{road}$ into the road surface-induced required damping force $DampRQST_{road}$ so that the road surface-induced required damping force $DampRQST_{road}$ and the operation-induced required damping force $DampRQST_{inertia}$ are different. More specifically, in the present embodiment, the road surface-induced state quantity conversion portion 400 makes the road surface-induced required damping force $DampRQST_{road}$ different from the operation-induced required damping force $DampRQST_{inertia}$ so that the road surface-induced required damping force $DampRQST_{road}$ becomes smaller than the operation-induced required damping force $DampRQST_{inertia}$.

"When the operation-induced state quantity $StateQ_{inertia}$ and the road surface induced state quantity $StateQ_{road}$ are the same" may be the case where these state quantities are completely the same amount or the case where they are substantially the same amount. The case of substantially the same amount is, for example, the case where some of components of both state quantities are the same amount, or the case where a part or all of each component of each state quantity is different only to the extent that it can be said that the amount is substantially the same.

In the present embodiment, even when a part or all of the state quantities that the operation induced state quantity $StateQ_{inertia}$ and the road surface-induced state quantity $StateQ_{road}$ have in common are the same amount, in the ECU 1, the operation-induced state quantity conversion portion 300 generates the operation-induced required damping force $DampRQST_{inertia}$ and the road surface-induced state quantity conversion portion 400 generates the road surface-induced required damping force $DampRQST_{road}$ so that the operation-induced required damping force $DampRQST_{inertia}$ is relatively smaller than the road surface-induced required damping force $DampRQST_{road}$. For example, even when a part or all of the state quantities that the operation-induced state quantity $StateQ_{inertia}$ and the road surface-induced state quantity $StateQ_{road}$ have in common are the same amount, the operation-induced state quantity conversion portion 300 converts the operation-induced state quantity $StateQ_{inertia}$ into the operation-induced required damping force $DampRQST_{inertia}$ so as to be relatively smaller than the case where the road surface-induced state quantity conversion portion 400 converts the road surface induced state quantity $StateQ_{road}$ into the road surface-induced required damping force $DampRQST_{road}$.

To make a relative difference in amount between the two, for example, it can be achieved by once converting both state quantities into the required damping force of the same magnitude, and then passing each of the converted damping forces through gains having different gain widths in each damping force. The comparison of each damping force after the conversion and the determination of the gain may be performed by any functional configuration in the ECU 1. Further, each gain may be of an appropriate size so as to obtain a balance between the operation feeling and the riding comfort, which will be described below, and can be appropriately determined based on the result of an experiment or a computer simulation.

By having such a configuration, the present embodiment makes it possible to realize, for example, damping force control that emphasizes an operation feeling, and also makes it possible to realize a wide range of settings in the control. As a result, it is possible to achieve both an operation feeling and a riding comfort within the range expected by the driver of the vehicle.

For example, it is assumed that the driver wants to emphasize riding comfort. It is preferable to control the damping force to suppress the roll (a component of the road surface-induced state quantity $StateQ_{road}$) caused by the road surface that cannot be predicted by a passenger in order to reduce the feeling of pushing up or the swell transmitted to the passenger. On the other hand, when the roll (a component of the operation-induced state quantity $StateQ_{inertia}$) caused by operation that can be predicted by the passenger is suppressed too much, the operation feeling is diluted and there is a concern that a phenomenon such as motion sickness may occur. Therefore, it is preferable to control the damping force to suppress the cause of the operation to the extent that the passenger can appropriately have the operation feeling.

In the present embodiment, for example, the gain width of the gain provided by the operation-induced state quantity conversion portion 300 is set to a value relatively smaller than the gain width of the gain provided by the road surface-induced state quantity conversion portion 400. This makes it possible to control the damping force that conveys an appropriate operation feeling while reducing the feeling of pushing up or swelling transmitted to the passenger, further achieving both the operation feeling and the riding comfort. In the present embodiment, from the viewpoint of obtaining the same advantages, the gain width of the gain provided by the road surface-induced state quantity conversion portion 400 may be set to a value relatively larger than the gain width of the gain provided by the operation-induced state quantity conversion portion 300.

[Determining Current Value to be Applied to Suspension]

The current value calculation portion 500 determines the current value to be applied to the suspension using the operation-induced required damping force converted by the operation-induced state quantity conversion portion and the road surface-induced required damping force converted by the road surface-induced state quantity conversion portion. The current value calculation portion 500 includes an addition portion 510 and a required current map 520.

The addition portion 510 calculates a required damping force DampRQST by adding the operation-induced required damping force $DampRQST_{inertia}$ and the road surface-induced required damping force $DampRQST_{road}$.

The required current map 520 is an example of the current value calculation portion. The required current map 520 acquires the required damping force DampRQST from the addition portion 510, and also acquires the damper speed DampV. The damper speed DampV can be acquired, for example, by feedback from a damper ECU or by a stroke sensor. In the present embodiment, the required current map 520 acquires the damper speed DampV from the RAM 20 in the same manner as the damper map 30. The required current map 520 determines a current value to be applied to the solenoid valve to control the damping force based on the required damping force DampRQST and the damper speed Damp V. At the determined current value, electricity is supplied to the above-described solenoid valve, and the suspension corresponding to each vehicle wheel of the vehicle is controlled.

Summary of This Embodiment

As is clear from the above description, a suspension control device (ECU 1) of a first embodiment of the present invention is a suspension control device which controls an operation of a suspension (suspension device 930) of a vehicle (900), including an operation-induced state quantity estimation portion (100) which estimates an operation-induced state quantity ($StateQ_{inertia}$) which represents behavior caused by an operation of the vehicle, a road surface-induced state quantity estimation portion (200) which estimates a road surface-induced state quantity ($State_{road}$) which represents behavior of the vehicle caused by a road surface, an operation-induced state quantity conversion portion (300) which converts the operation-induced state quantity into an operation-induced required damping force $DampRQST_{inertia}$, a road surface-induced state quantity conversion portion (400) which converts the road surface-induced state quantity into a road surface-induced required damping force $DampRQST_{road}$, and a current value calculation portion (500) which determines a current value to be applied to the suspension using the operation-induced required damping force and the road surface-induced required damping force.

Further, the vehicle according to the first embodiment of the present invention has a suspension controlled by the suspension control device described above.

Further, a suspension control method of the first embodiment of the present invention is a suspension control method for controlling an operation of a suspension of a vehicle, including an operation-induced state quantity estimation step of estimating an operation-induced state quantity which represents behavior caused by an operation of the vehicle, a road surface-induced state quantity estimation step of estimating a road surface-induced state quantity which represents behavior of the vehicle caused by a road surface, an operation-induced state quantity conversion step of converting the operation-induced state quantity into an operation-induced required damping force, following the operation-induced state quantity estimation step, a road surface-induced state quantity conversion step of returning the road surface-induced state quantity to a road surface-induced required damping force, following the road surface-induced state quantity estimation step, and a current value calculation step of determining a current value to be applied to the suspension using the operation-induced required damping force and the road surface-induced required damping force, following the operation-induced state quantity conversion step and the road surface-induced state quantity conversion step.

Therefore, the first embodiment of the present invention can provide the operation feeling and the riding comfort suitable for a driver of an automobile.

In the present embodiment, when the operation-induced state quantity and the road surface-induced state quantity are the same, the road surface-induced state quantity conversion portion converts the road surface-induced state quantity into the road surface-induced required damping force so that the operation-induced required damping force and the road surface-induced required damping force are different. Such a configuration is even more effective from the viewpoint of providing the driver of the vehicle with a favorable balance between the operation feeling and the riding comfort.

In the present embodiment, by converting the road surface-induced state quantity into the road surface-induced required damping force so that the road surface-induced required damping force is relatively smaller than the operation-induced required damping force, the road surface-induced state quantity conversion portion makes the road surface-induced required damping force different from the operation-induced required damping force. Such a configuration is even more effective from the viewpoint of controlling the traveling of the vehicle in a preferable state in which the driver of the vehicle has both an operation feeling and a riding comfort.

Second Embodiment

Another embodiment of the present invention will be described below. For convenience of description, the same reference numerals are given to the members having the same functions as the members described in the above-described embodiment, and the description thereof will not be repeated.

In the present embodiment, the operation tire stroke displacement arithmetic portion 110 treats a ground contact load described in JP-A 2013-216278 as an inertial load and calculates the $TireST_{inertia}$, and the road surface tire stroke displacement arithmetic portion 210 treats an unsprung load described in International Publication No. 2014/002444 as a road surface load and calculates the $TireST_{road}$. As described above, the present invention can be realized by utilizing a plurality of methods, and in any case, it should be construed as being included in the claims of the present application.

In the present embodiment, when the operation-induced state quantity and the road surface-induced state quantity are the same, the road surface-induced state quantity conversion portion converts the road surface-induced state quantity into a road surface-induced required damping force by making the road surface-induced required damping force and the operation-induced required damping force different from each other so that the road surface-induced required damping force is larger than the operation-induced required damping force. Other than that, the present embodiment is the same as the above-described first embodiment.

In the present embodiment, even when a part or all of the state quantities that the operation induced state quantity $StateQ_{inertia}$ and the road surface-induced state quantity $StateQ_{road}$ have in common are the same amount, the ECU 1 causes the operation-induced state quantity conversion portion 300 to acquire the operation-induced required damping force $DampRQST_{inertia}$, and causes the road surface-induced state quantity conversion portion 400 to acquire the road surface-induced required damping force $DampRQST_{road}$ so that the operation-induced required damping force $DampRQST_{inertia}$ is relatively larger than the road surface-induced required damping force $DampRQST_{road}$. For example, even when a part or all of the state quantities that the operation-induced state quantity $StateQ_{inertia}$ and the road surface induced state quantity $StateQ_{road}$ have in common are the same amount, the operation-induced state quantity conversion portion 300 converts the operation-induced state quantity $StateQ_{inertia}$ into the operation-induced required damping force $DampRQST_{inertia}$ more than the road surface-induced state quantity conversion portion 400 converts the road surface-induced state quantity $StateQ_{road}$ into the road surface-induced required damping force $DampRQST_{road}$ Similar to the first embodiment described above, the relative difference in magnitude between the two required damping forces can be achieved, for example, by converting both state quantities into required damping forces of the same magnitude and then passing each converted damping force through gains having different gain widths in each damping force.

Here, a situation in which information transmission from the road surface, such as driving on rough roads, should be given more importance is assumed. In such a situation, the gain width of the gain provided in the road surface-induced state quantity conversion portion 400 is set to a value that does not suppress the road surface-induced state quantity $StateQ_{road}$ so much. Further, in order to make the road surface-induced state quantity $StateQ_{road}$ more conspicuous, the gain width of the gain provided in the operation-induced state quantity conversion portion 300 is set to a value in which the influence of the vehicle traveling caused by the driving operation is transmitted to the passenger less than when the riding comfort is emphasized. For example, the gain width of the gain provided in the operation-induced state quantity conversion portion 300 is set to a value relatively larger than the gain width of the gain provided in the road surface-induced state quantity conversion portion 400. As a result, as described above, it is possible to make the information from the road surface stand out as much as possible and transmit it to the passengers.

In the present embodiment, by converting the road surface-induced state quantity to the road surface-induced required damping force so that the road surface-induced required damping force is relatively larger than the operation-induced required damping force, the road surface-induced state quantity conversion portion makes the road surface-induced required damping force different from the operation-induced required damping force. Such a configuration is even more effective from the viewpoint of appropriately controlling the traveling of the vehicle in a situation where the transmission of information from the road surface should be emphasized.

Third Embodiment

Another embodiment of the present invention will be described below. For convenience of description, the same reference numerals are given to the members having the same functions as the members described in the above-described embodiment, and the description thereof will not be repeated.

In the present embodiment, the ECU 1 further includes a traveling condition acquisition portion which acquires information regarding a traveling condition of the vehicle. Then, the ECU 1 causes one or both of the operation-induced state quantity conversion portion and the road surface-induced state quantity conversion portion to make the operation-induced required damping force and the road surface-induced required damping force different from each other so that the traveling condition is transmitted to the driver according to the information acquired by the traveling condition acquisition portion. Other than that, the present embodiment is the same as the above-described first embodiment or the second embodiment.

Figure 5:
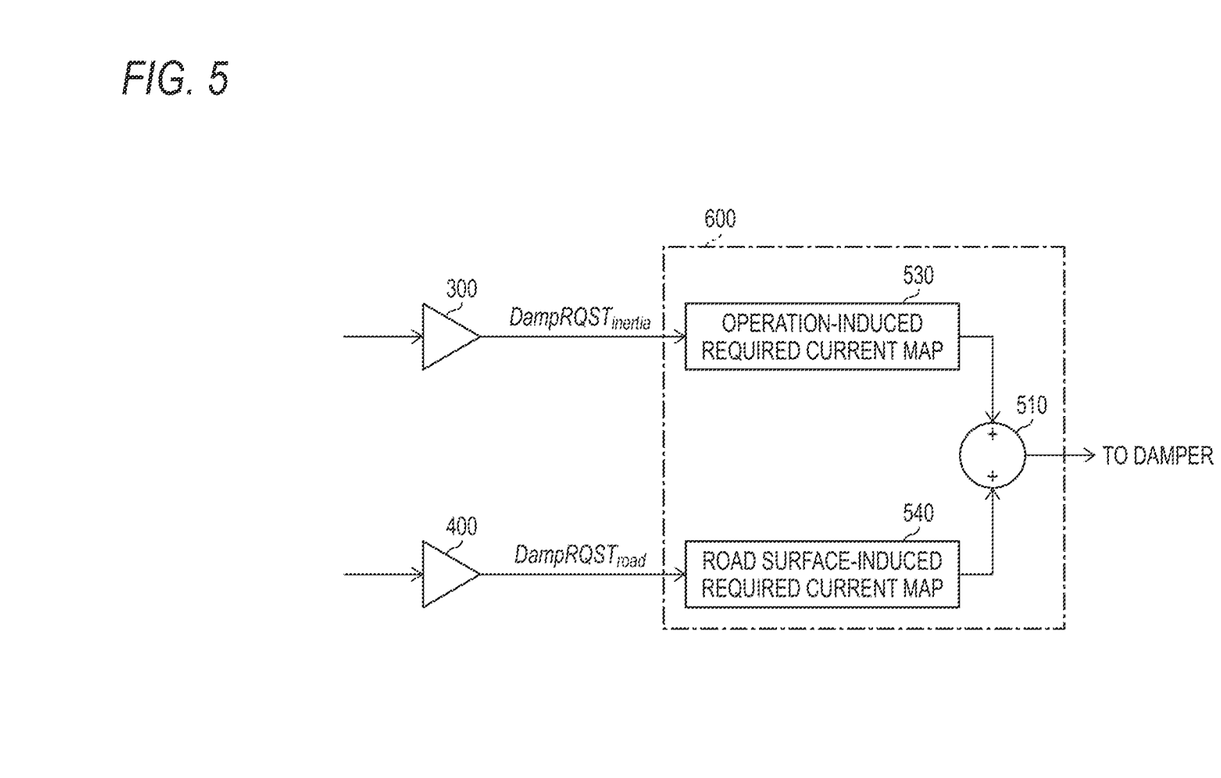
FIG. 5 is a block diagram schematically illustrating a functional configuration of a current value calculation portion according to another embodiment of the present invention.

FIG. 5 is a block diagram schematically illustrating a functional configuration of the current value calculation portion according to the present embodiment. As illustrated in FIG. 5, the current value calculation portion 600 includes an operation-induced required current map 530 and a road surface-induced required current map 540 in place of the required current map 520. Also, an addition portion 510 is connected downstream of these maps.

The operation-induced required current map 530 acquires the operation-induced required damping force DampRQST$_{inertia}$ from the operation-induced state quantity conversion portion 300, and also acquires the damper speed DampV (not illustrated), and then based on them, the operation-induced required current map 530 determines an operation-induced current value to be applied to the solenoid valve to control the damping force caused by the operation of the vehicle 900. The road surface-induced required current map 540 acquires the road surface-induced required damping force DampRQST$_{road}$ from the road surface-induced state quantity conversion portion 400, and also acquires the damper speed DampV (not illustrated), and then based on them, the road surface-induced required current map 540 determines a road surface-induced current value to be applied to the solenoid valve to control the damping force caused by the road surface. The addition portion 510 totals the operation-induced current value and the road surface-induced current value to calculate the current value applied to the suspension.

In the present embodiment, the traveling condition acquisition portion acquires information on the traveling condition of the vehicle. The information regarding the traveling condition of the vehicle may be information acquired from the actual traveling condition, or may be information that brings about a change in the traveling condition. Information about the traveling condition of the vehicle comes from, for example, various sensors. Further, the information may be communication data that can be received by the ECU 1.

Further, in the present embodiment, the ECU 1 is configured to automatically determine the traveling condition or the operating condition of the vehicle and automatically switch between the gain width of the gain included in the operation-induced state quantity conversion portion 300 and the gain width of the gain included in the road surface-induced state quantity conversion portion 400. For example, the ECU 1 is configured to change each of the gain width of the gain included in the operation-induced state quantity conversion portion 300 and the gain width of the gain included in the road surface-induced state quantity conversion portion 400 to a specific value, or to switch the magnitude relationship thereof, depending on the combination of vehicle traveling condition information acquired by the traveling condition acquisition portion. Also, for example, when the operation-induced state quantity and the road surface-induced state quantity are the same, the ECU 1 can generate a relative magnitude relationship between the operation-induced required damping force and the road surface-induced required damping force according to the information acquired by the traveling condition acquisition portion.

More specifically, it is assumed that the ECU 1 determines a traveling condition in which the driver may be dozing off according to the information acquired by the traveling condition acquisition portion. In this case, the ECU 1 determines the gain width of the operation-induced state quantity conversion portion 300 and the gain width of the road surface-induced state quantity conversion portion 400 based on a set value for positively transmitting the information transmission from the road surface. As a result, information caused by the road surface such as unevenness of the road surface is more clearly transmitted to the driver, and the driver's awakening is promoted.

Further, for example, the ECU 1 detects or predicts deterioration of the road surface condition according to the information on the traveling condition based on the detection values of various sensors or the information on the weather such as rainfall by the data link. In this case, the ECU 1 determines the gain width of the operation-induced state quantity conversion portion 300 and the gain width of the road surface-induced state quantity conversion portion 400 based on a set value for positively transmitting the information transmission from the road surface. As a result, changes in the road surface condition due to the wetness of the road surface are reflected in the operability or riding comfort of the vehicle, and the driver can perceive the deterioration of the road surface condition.

When the information according to the traveling condition to be transmitted to the driver is not acquired, the ECU 1 controls the suspension of the vehicle as in the above-described embodiment, thereby achieving both an operation feeling and a riding comfort.

In the present embodiment, the ECU 1 further includes a traveling condition acquisition portion which acquires information regarding the traveling condition of the vehicle, and the ECU 1 causes one or both of the operation-induced state quantity conversion portion and the road surface-induced state quantity conversion portion to make the road surface-induced required damping force and the operation-induced required damping force different from each other so that the traveling condition is transmitted to the driver according to the information acquired by the traveling condition acquisition portion. Such a configuration is even more effective from the viewpoint of maintaining an appropriate and stable traveling state of the vehicle.

Modification Example

As is clear from the above description, by separating the operation cause and the road surface cause and setting a target damping force, the present invention can realize a setting according to a wide range of situations such as damping force control that emphasizes an operation feeling or damping force control that emphasizes transmission of road surface conditions to a passenger. The present invention is not limited to the above-described embodiments, and various modifications can be made within the scope of the claims. The technical scope of the present invention also includes embodiments obtained by appropriately combining the technical means disclosed in the different embodiments.

For example, the values of the sensors described in the above-described embodiment are examples. In the present invention, various sensor values can be used depending on the configuration of the operation-induced state quantity estimation model 120 or the road surface-induced state quantity estimation model 220. For example, the damper force DampF may be detected from a stroke sensor provided in the vehicle. Further, the yaw rate may be acquired by differentiating the value of the yaw angle sensor. Alternatively, the yaw rate may be acquired based on the value of the lateral acceleration sensor.

Further, the damper force DampF may be calculated each time by using the applied current I and the damper speed DampV as variables instead of the acquisition from the damper map described above.

Further, the Kalman gain K may be changed over time. In that case, the time-variant Kalman gain K can be acquired by calculating the Kalman gain K as an optimum Kalman gain for each calculation step, while appropriately modifying the state covariance of each state quantity, the process noise covariance of each calculation noise, and the covariance of the observed values.

In the above-described embodiment, the operation-induced state quantity and the road surface-induced state quantity are estimated based on the state quantity related to the tire. In the present invention, the operation-induced state quantity and the road surface-induced state quantity may be estimated based on other state quantities related to the vehicle. For example, the operation-induced state quantity and the road surface-induced state quantity can be estimated based on a sensor which detects the state quantity more directly in the vehicle by utilizing the related art. Examples of the sensor which directly detects the state quantity include a tire pneumatic sensor which detects the pneumatic pressure of the tire. Since the increase and decrease in the value of the tire pneumatic sensor indicates the deformation of the tire, the tire stroke displacement TireST can be detected. Further, the operation-induced state quantity and the road surface-induced state quantity may be estimated based on different state quantities related to the vehicle.

Further, in the embodiment of the present invention, even when the operation-induced state quantity and the road surface-induced state quantity are the same, the road surface-induced state quantity may be converted into the road surface-induced required damping force from the road surface-induced required damping force and the operation-induced required damping force. In this case, the calculation result of the suspension control device (ECU 1) may be used as it is for the suspension control, or the calculation result may not be used for the suspension control and the calculation may be ended when it is determined that the operation-induced state quantity and the road surface-induced state quantity are the same.

Further, in the embodiment of the present invention, instead of or in addition to the change in the gain width of the gain of the operation-induced state quantity conversion portion 300 and the gain width of the gain of the road surface-induced state quantity conversion portion 400 in the third embodiment described above, the gain width of the gain may be changed according to the operation by the driver.

Further, in the embodiment of the present invention, in the above-described third embodiment, the current value calculation portion 600 further includes a gain of the operation-induced current value and a gain of the road surface-induced current value, and the gain width of these gains may be changed according to the information acquired by the traveling condition acquisition portion.

Further, in the embodiment of the present invention, instead of the road surface-induced state quantity conversion portion, the operation-induced state quantity conversion portion may convert the operation-induced state quantity to the operation-induced required damping force so that the road surface-induced required damping force and the operation-induced required damping force are different.

More specifically, when the operation-induced state quantity and the road surface-induced state quantity are the same, the operation-induced state quantity conversion portion may convert the operation-induced state quantity into the operation-induced required damping force so that the operation-induced required damping force and the road surface-induced required damping force are different. In addition, the operation-induced state quantity conversion portion may make the road surface-induced required damping force and the operation-induced required damping force differ from each other by converting the operation-induced state quantity into the operation-induced required damping force so that the operation-induced required damping force is relatively smaller than the road surface-induced required damping force. In addition, the operation-induced state quantity conversion portion may make the road surface-induced required damping force and the operation-induced required damping force differ from each other by converting the operation-induced state quantity into the operation-induced required damping force so that the operation-induced required damping force is relatively larger than the road surface-induced required damping force. Even with such a functional configuration, it is possible to obtain the same effect as that of the above-described embodiment.

Further, in the embodiment of the present invention, instead of the ECU (suspension control device), one or both of the operation-induced state quantity conversion portion and the road surface-induced state quantity conversion portion may be provided with the traveling condition acquisition portion. Even in such a form, it is possible to generate a relative magnitude relationship between the operation-induced required damping force and the road surface-induced required damping force according to the information acquired by the traveling condition acquisition portion.

In the embodiments of the present invention, the control block (especially operation-induced state quantity estimation portion 100 and road surface-induced state quantity estimation portion 200) of the ECU 1 may be realized by a logic circuit (hardware) formed in an integrated circuit (IC chip) or the like, or may be realized by software.

In the latter case, the ECU 1 includes, for example, one or more processors, and also includes a recording medium in which a program for realizing each function is stored readably by the processor. The processor reads the program from the recording medium and executes it.

As the processor, for example, a central processing unit (CPU) can be used. As the recording medium, a "non-temporary tangible medium" such as a read only memory (ROM), a tape, a disk, a card, a semiconductor memory, a programmable logic circuit, or the like can be used. Further, a random access memory (RAM) for loading the above-described program may be further provided.

The program may be supplied to the computer via any transmission medium (communication network, broadcast wave, and the like) capable of transmitting the program. An aspect of the present invention can also be realized in the form of a data signal embedded in a carrier wave, in which the above-described program is embodied by electronic transmission.

REFERENCE SIGNS LIST

1: ECU
10: various sensors
11: vehicle wheel speed sensor
12: yaw rate sensor
13: front-rear G sensor
14: lateral G sensor
15: torque sensor
16: steering angle sensor
17: engine torque sensor
18: engine rotation speed sensor
19: brake pressure sensor
20: RAM
30: damper map
100: operation-induced state quantity estimation portion
110: operation tire stroke displacement arithmetic portion
120: operation-induced state quantity estimation model
121, 131, 133, 221, 232: first arithmetic portion
122, 133, 134, 223, 233: second arithmetic portion
123: input amount configuration portion
124, 134: third arithmetic portion
125, 222, 510: addition portion 126: fourth arithmetic portion
127, 224: delay portion
130: operation-induced state quantity correction portion
132, 231: subtraction portion
140: operation-induced state quantity correction addition portion
200: road surface-induced state quantity estimation portion
210: road surface tire stroke displacement arithmetic portion
220: road surface-induced state quantity estimation model
230: road surface-induced state quantity correction portion
240: road surface-induced state quantity correction addition portion
300: operation-induced state quantity conversion portion
400: road surface-induced state quantity conversion portion
500, 600: current value calculation portion
520: required current map
530: operation-induced required current map
540: road surface-induced required current map
900: vehicle
910: vehicle body
920, 920A, 920B, 920C, 920D: vehicle wheel
921, 921A, 921B, 921C, 921D: tire
930: suspension device
941: rack shaft
942: rack and pinion mechanism
943: torque application portion
944: steering shaft
945: steering member
950: engine
970: power generation device
980: battery

What is claimed is:

1. A suspension control device which controls an operation of a suspension of a vehicle comprising:
an operation-induced state quantity estimation portion which estimates an operation-induced state quantity which represents behavior caused by an operation of the vehicle;
a road surface-induced state quantity estimation portion which estimates a road surface-induced state quantity which represents behavior of the vehicle caused by a road surface on which the vehicle travels;
an operation-induced state quantity conversion portion which converts the operation-induced state quantity into an operation-induced required damping force by multiplying the operation-induced state quantity by a predetermined first coefficient;
a road surface-induced state quantity conversion portion which converts the road surface-induced state quantity into a road surface-induced required damping force by multiplying the road surface-induced state quantity by a predetermined second coefficient, and which converts the road surface-induced state quantity into the road surface-induced required damping force so that a magnitude of the road surface-induced required damping force and a magnitude of the operation-induced required damping force are relatively different when the operation-induced state quantity and the road surface-induced state quantity are the same; and
a current value calculation portion which determines a current value to be applied to the suspension with reference to the operation-induced required damping force, the road surface-induced required damping force, and a damper speed, which is a speed of a damper of the suspension.

2. The suspension control device according to claim 1, wherein
the current value calculation portion determines a current value to be applied to the suspension using a map which refers to the operation-induced required damping force, the road surface-induced required damping force, and the damper speed.

3. The suspension control device according to claim 1, wherein
when the operation-induced state quantity and the road surface-induced state quantity are the same, the road surface-induced state quantity conversion portion converts the road surface-induced state quantity into the road surface-induced required damping force so that a magnitude of the road surface-induced required damping force is relatively larger than a magnitude of the operation-induced required damping force.

4. The suspension control device according to claim 1, wherein
when the operation-induced state quantity and the road surface-induced state quantity are the same, the road surface-induced state quantity conversion portion converts the road surface-induced state quantity into the road surface-induced required damping force so that a magnitude of the road surface-induced required damping force is relatively smaller than a magnitude of the operation-induced required damping force.

5. A vehicle comprising:
the suspension control device according to claim 1; and
a suspension controlled by the suspension control device.

6. A suspension control method for controlling an operation of a suspension of a vehicle comprising:
an operation-induced state quantity estimation step of estimating an operation-induced state quantity which represents behavior caused by an operation of the vehicle;
a road surface-induced state quantity estimation step of estimating a road surface-induced state quantity which represents behavior of the vehicle caused by a road surface on which the vehicle travels;
an operation-induced state quantity conversion step of converting the operation-induced state quantity into an operation-induced required damping force by multiplying the operation-induced state quantity estimated in the operation-induced state quantity estimation step by a predetermined first coefficient;
a road surface-induced state quantity conversion step of converting the road surface-induced state quantity into a road surface-induced required damping force by multiplying the road surface-induced state quantity estimated in the road surface-induced state quantity estimation step by a predetermined second coefficient, and converting the road surface-induced state quantity into the road surface-induced required damping force so that a magnitude of the road surface-induced required damping force and a magnitude of the operation-induced required damping force are relatively different when the operation-induced state quantity and the road surface-induced state quantity are the same; and
a current value calculation step of determining a current value applied to the suspension with reference to the operation-induced required damping force converted in the operation-induced state quantity conversion step, the road surface-induced required damping force converted in the road surface-induced state quantity conversion step, and a damper speed, which is a speed of a damper of the suspension.

7. The suspension control method according to claim 6, wherein in the current value calculation step, a current value to be applied to the suspension is determined using a map which refers to the operation-induced required damping force, the road surface-induced required damping force, and the damper speed.

8. The suspension control device according to claim 2, wherein when the operation-induced state quantity and the road surface-induced state quantity are the same, the road surface-induced state quantity conversion portion converts the road surface-induced state quantity into the road surface-induced required damping force so that a magnitude of the road surface-induced required damping force is relatively larger than a magnitude of the operation-induced required damping force.

9. The suspension control device according to claim 2, wherein when the operation-induced state quantity and the road surface-induced state quantity are the same, the road surface-induced state quantity conversion portion converts the road surface-induced state quantity into the road surface-induced required damping force so that a magnitude of the road surface-induced required damping force is relatively smaller than a magnitude of the operation-induced required damping force.

10. A vehicle comprising:

the suspension control device according to claim 2; and a suspension controlled by the suspension control device.

11. A vehicle comprising:

the suspension control device according to claim 3; and a suspension controlled by the suspension control device.

12. A vehicle comprising:

the suspension control device according to claim 4; and a suspension controlled by the suspension control device.

* * * * *